US008447450B2

(12) United States Patent
Hennings et al.

(10) Patent No.: US 8,447,450 B2
(45) Date of Patent: May 21, 2013

(54) METHOD AND DEVICE FOR SPECIFYING A BOOST CONTROL STRATEGY OF A HYBRID VEHICLE DRIVE

(75) Inventors: Stephan Hennings, Leonberg (DE); Alexander Basler, Karlsruhe (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 298 days.

(21) Appl. No.: 13/019,773

(22) Filed: Feb. 2, 2011

(65) Prior Publication Data
US 2011/0196557 A1   Aug. 11, 2011

(30) Foreign Application Priority Data
Feb. 8, 2010  (DE) .......................... 10 2010 008 019

(51) Int. Cl.
*B60K 6/22* (2007.10)

(52) U.S. Cl.
USPC ..................... 701/22; 180/65.285; 180/65.29; 180/65.31

(58) Field of Classification Search
USPC ............... 701/22, 23, 24, 25, 26, 1; 180/65.2, 180/65.3, 65.4, 65.8, 65.21, 65.24, 65.285, 180/65.29, 65.31; 290/40 C, 40 D
See application file for complete search history.

(56) References Cited

U.S. PATENT DOCUMENTS

| | | | |
|---|---|---|---|
| 6,687,607 B2 | 2/2004 | Graf et al. | |
| 7,794,109 B2 * | 9/2010 | Miyasu et al. | ................ 362/240 |
| 7,958,958 B2 * | 6/2011 | de La Torre Bueno | .... 180/65.29 |
| 8,005,587 B2 * | 8/2011 | Tamor et al. | .................... 701/22 |
| 8,069,940 B2 * | 12/2011 | Nenno et al. | ............... 180/65.21 |

FOREIGN PATENT DOCUMENTS

| | | |
|---|---|---|
| DE | 198 31 487 | 3/2000 |
| DE | 1 270 303 | 5/2002 |
| DE | 10 2005 055 243 | 5/2007 |
| DE | 10 2007 003 765 | 7/2008 |
| DE | 10 2007 016 420 | 10/2008 |
| WO | 2009/141646 | 11/2009 |

* cited by examiner

*Primary Examiner* — Richard M. Camby
(74) *Attorney, Agent, or Firm* — Gerald E. Hespos; Michael J. Porco; Matthew T. Hespos

(57) ABSTRACT

A method and a device are provided for specifying a boost control strategy of a hybrid vehicle drive. The method includes predefining a driving track (R) with a multiplicity of track sections (G1-G4; K1-K4); determining a dependency of a lap time gain ($\Delta t$) on a boost energy quantity ($E_{boost}$) used, proceeding from a vehicle-specific lap time without boost assistance from the electric motor (G1, G2) for a plurality of predetermined track sections (G1-G4); and defining a respective partial boost energy quantity ($E_{Boost1}$, $E_{Boost2}$, $E_{Boost3}$, $E_{Boost4}$) for each track section (G1-G4) based on the determined dependencies, with a sum of the partial boost energy quantities ($E_{Boost1}$, $E_{Boost2}$, $E_{Boost3}$, $E_{Boost4}$) corresponding to a predefined available total boost energy quantity ($E_{Boostm}$).

10 Claims, 5 Drawing Sheets

METHOD AND DEVICE FOR SPECIFYING A BOOST CONTROL STRATEGY OF A HYBRID VEHICLE DRIVE

CROSS-REFERENCE TO RELATED APPLICATION

This application claims priority under 35 USC 119 to German Patent Application No. 10 2010 008 019.5, filed on Feb. 8, 2010, the entire disclosure of which is incorporated herein by reference.

BACKGROUND OF THE INVENTION

1. Field of the Invention

The invention relates to a method and a device for specifying a boost control strategy of a hybrid vehicle drive.

2. Description of the Related Art

Hybrid drives have been on the market for a number of years as a fuel-saving and more environmentally-friendly alternative to the conventional internal combustion engine. The hybrid drive generally is defined as having at least two different energy converters and two different energy stores.

The converters generally are an internal combustion engine and an electric motor. The energy store for the internal combustion engine generally is a combustible fuel and the energy store for the electric motor generally is a battery, a capacitor or a flywheel.

A hybrid vehicle has an advantage over conventional vehicles with internal combustion engines that the hybrid vehicle can recover most of the braking energy (with the exception of the efficiency losses). The recovered or recuperated braking energy is buffered in the battery of the electric motor, with the electric motor functioning as a mechanical-electrical converter.

The buffering of the energy, that is to say the recuperation, takes place during active braking and in the overrun mode. The overrun mode is a vehicle state in which the internal combustion engine is not actively driving the vehicle because the driver has released the accelerator pedal. The vehicle is thus in a passive state and is propelled only by its own inertial mass, until the various driving resistances gradually decelerate the vehicle until it comes to a halt. The supply of gasoline and the ignition are deactivated in hybrid vehicles during the overrun phase. Furthermore, technical measures are taken to prevent engine braking by the internal combustion engine in the overrun mode and hence to allow the kinetic energy to be made available as completely as possible to the electric motor, which is configured as a mechanical-electrical converter.

A kinetic energy recovery system (KERS) recently has been used in automobile racing to recover kinetic energy. The stored energy is used to operate the electric motor for a short time on demand, such that the power of the electric motor can be used in addition to the main motor, the internal combustion engine, in acceleration phases. These phases in which the main motor is assisted by an electric motor are referred to as boost phases. The storable maximum energy quantity available for boosting for the electric motor is limited, for example to 500 kJ.

In the mechanical variant for the energy store of the electric motor, in a vacuum cylinder, a flywheel system that rotates at up to 64,000 rpm is accelerated by the braking process, and later can impart the stored energy back to the drive axle via a continuously variable gearing. Such an energy recovery system is disclosed for example in WO 2009/141646 A1.

It is an object of the present invention to provide an improved method and an improved device for specifying a boost control strategy of a hybrid vehicle drive to make it possible to utilize the maximum available energy quantity in an efficient manner.

SUMMARY OF THE INVENTION

The invention is based on the concept of a respective partial boost energy quantity for each predetermined track section being defined on the basis of determined dependencies of a lap time gain on a boost energy quantity used, proceeding from a vehicle-specific lap time without boost assistance from the electric motor.

The respective partial boost energy quantities preferably are defined taking into consideration a respective gradient of the determined dependencies.

Additionally, the respective partial boost energy quantities may be defined by taking into consideration a charge state of an electrical energy store for storing the boost energy in the respective track section.

Still further, the respective partial boost energy quantities may be defined by taking into consideration a no-load loss of the electrical energy store.

Exemplary embodiments of the invention are illustrated in the drawing and will be explained in more detail in the following description.

DESCRIPTION OF THE PREFERRED EMBODIMENTS

In the figures, the same reference symbols are used to denote identical or functionally identical elements.

Figure 1:
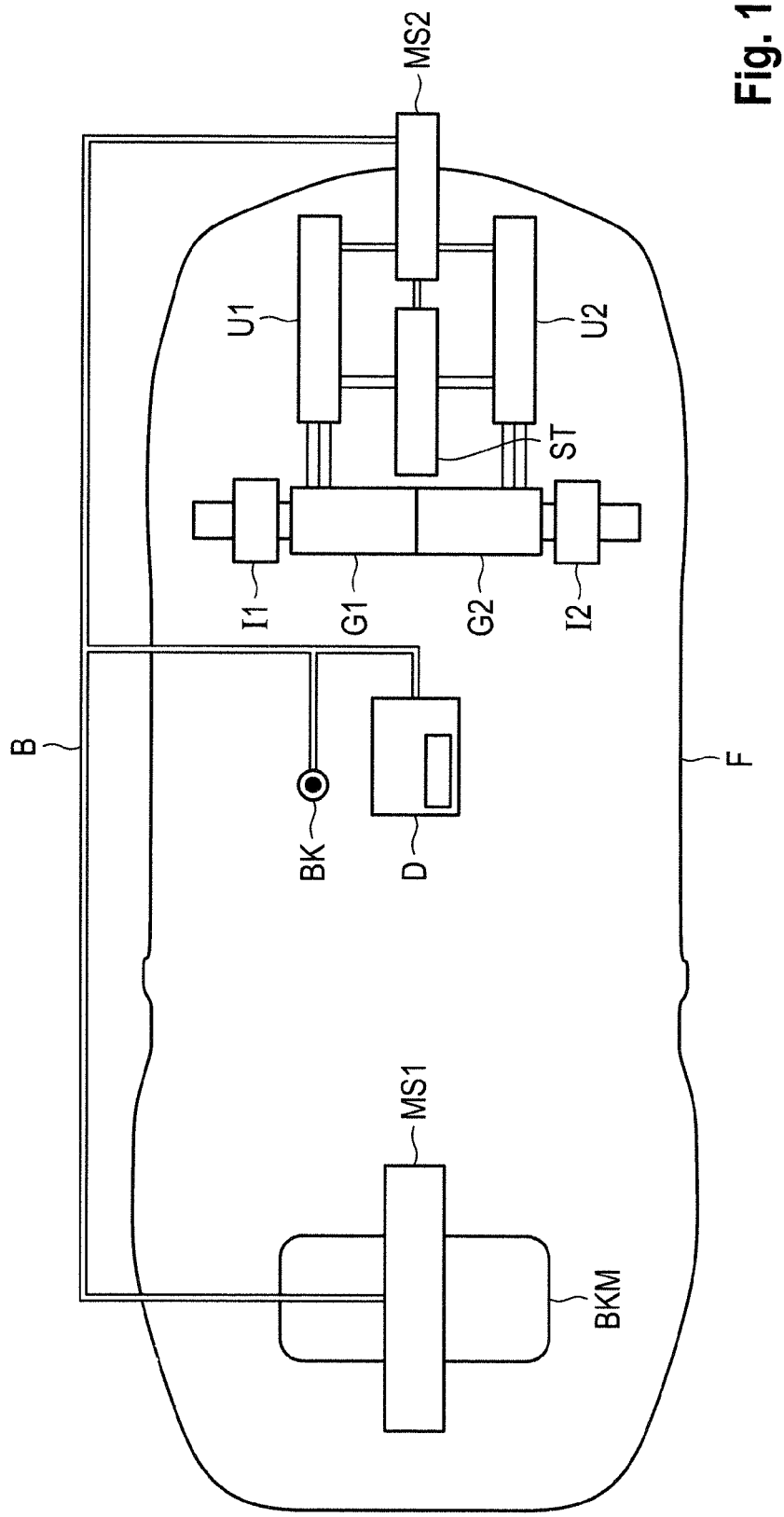
FIG. 1 is a block diagram of a hybrid vehicle drive to which the present invention can be applied.

FIG. 1 is a block diagram of a hybrid vehicle drive to which the present invention can be applied. In FIG. 1, the reference symbol F denotes a vehicle in the form of a racing car with a hybrid vehicle drive. An internal combustion engine BKM, controlled by a first engine controller MS1, imparts a drive force to the rear wheels of the vehicle F. Two electromotive generators G1, G2 are situated in the front region of the vehicle F and can be connected via transmission gearings 11, 12 to the front wheels of the motor vehicle F to impart an additional drive force thereto. An electrical energy store ST stores electrical energy for the generators G1, G2 and converters U1, U2 are provided between the electrical energy store ST and the respective generators G1 and G2. The converters U1, U2 can operate bidirectionally. In an electric drive mode, the converters U1, U2 supply electrical energy from the electrical energy store ST to the generators G1, G2 as three-phase current. In a recuperation mode, the converters U1, U2 convert three-phase current energy provided by the generators G1, G2 into a direct current, and charge the electrical energy store ST with the current.

The electric drive of the vehicle F is controlled by a second motor controller MS2. The reference symbol BK denotes a boost button that enables a driver to switch into a boost mode on demand. Reference symbol D denotes a display device that displays or indicates to the driver a boost control strategy for actuating the boost button BK.

The components MS1, MS2, BK, D of the hybrid vehicle drive are networked with one another via a bus system B, for example a CAN bus, and in this way can communicate with one another according to predefined protocol sequences.

The hybrid vehicle drive according to FIG. 1, controlled by the engine controllers MS1, MS2, can operate in the following drive modes:

a) conventional internal combustion engine operation without activation of the electric drive;

b) electric drive without activation of the conventional internal combustion engine drive;

c) boosting, with the internal combustion engine drive being assisted by the electric drive;

d) recuperation, with the kinetic energy of the vehicle being recovered in the form of electrical energy for the electrical energy store ST; and e) load-point-raising operation, with the internal combustion engine BKM providing a part of its torque to the drive output and providing the remaining part as a generator torque for the generators G1, G2 to generate electrical energy for the electrical energy store and store the electrical energy therein.

Figure 2:
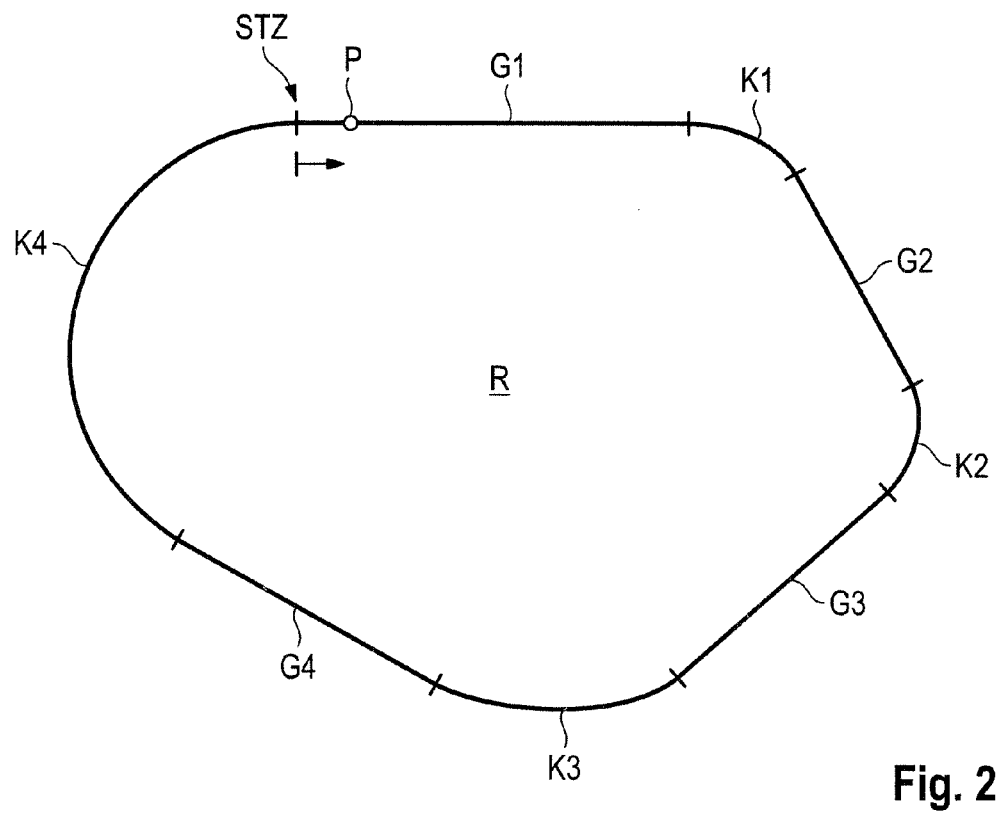
FIG. 2 is a schematic illustration of a driving course in the form of circuit, to which the present invention can be applied.

FIG. 2 is a schematic illustration of a driving course in the form of a circuit, to which the invention can be applied. The driving course R of FIG. 2 begins and ends at start/finish STZ and, during an automobile race, usually is covered multiple times.

The driving track R has straight sections G1, G2, G3, G4 and, between these, curve sections K1, K2, K3, K4. The topology of the driving course is predefined and can be represented as numerical parameters, for example track section as a function of distance s covered since the start/finish STZ, and gradient and curvature at every point P of the driving course R.

Before the start of an automobile race, the driver and/or the service crew are faced with the problem of specifying an optimized boost control strategy of the hybrid vehicle drive of the vehicle F according to FIG. 1, in which the available total boost energy quantity $E_{boostm}$ is distributed optimally over the track sections G1-G4 and K1-K4. Without being restricted to this, in the embodiment of the method of the invention described below, the total boost energy quantity $E_{boostm}$ is distributed exclusively between the four straight sections G1-G4, because in these sections the maximum speed $v_{max}$ of the motor vehicle should be reached as quickly as possible.

Figure 3:
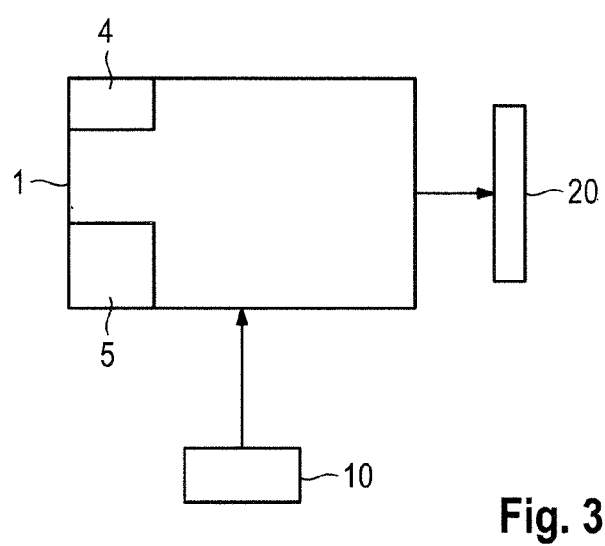
FIG. 3 is a block diagram of an embodiment of a device according to the invention for specifying a boost control strategy of a hybrid vehicle drive.

FIG. 3 shows a block diagram of an embodiment of a device according to the invention for specifying a boost control strategy of a hybrid vehicle drive.

The boost control strategy of the hybrid vehicle drive of the vehicle F is defined in the device denoted in FIG. 3 by the reference symbol 1. The device 1 conventionally is situated outside the vehicle F, and is a computer.

The device 1 has an input device 10 for inputting the numerical parameters of the driving course R, as described above in conjunction with FIG. 2.

Furthermore, the device 1 has a simulation device 4 for determining a respective dependency of a lap time gain $\Delta t$ on a boost energy quantity $E_{boost}$ used, proceeding from a vehicle-specific lap time without boost assistance from the electric motor G1, G2 for the four straight sections G1-G4.

An optimization device 5 can calculate a distribution of the total boost energy quantity $E_{Boostm}$ over the four straight sections in partial boost energy quantities $E_{Boost1}$, $E_{Boost2}$, $E_{Boost3}$, $E_{Boost4}$, and can calculate the resulting time gain $\Delta t$ for the lap time T of the driving course R according to FIG. 2 for different distributions of partial boost energy quantities. The resulting time gain $\Delta t$ is in relation to a predefined vehicle-specific lap time T* that can be achieved solely with the internal combustion engine BKM without boosting.

The simulation device 5 operates using known mathematical variation and optimization algorithms.

Figure 5A:
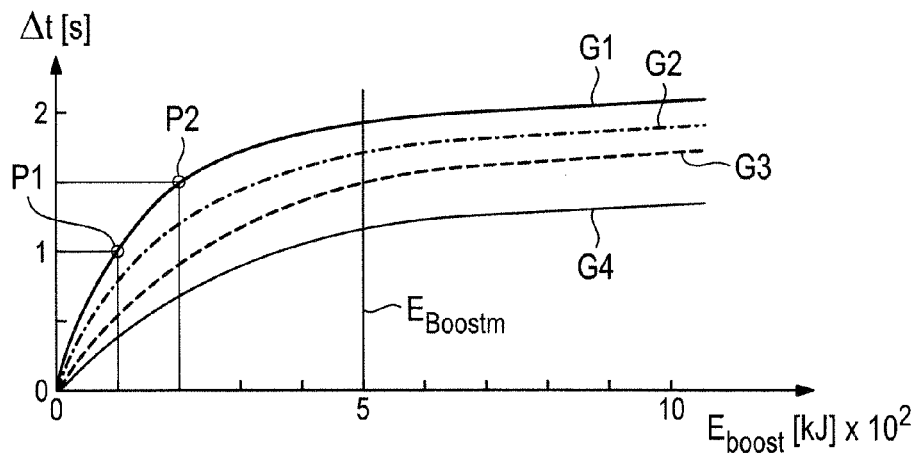
FIG. 5*a* is an illustration of a lap time gain $\Delta t(s)$ as a function of the boost energy quantity $E_{boost}(kJ)$ used for the straights G1 to G4 of the driving course of FIG. 2.

FIG. 5a shows an illustration of the lap time gain $\Delta t(s)$ as a function of the boost energy quantity $E_{boost}(kJ)$ used for the straights G1 to G4 of the driving course of FIG. 2.

As illustrated in FIG. 5a, for the lap time gain $\Delta t$, a characteristic set of curves is obtained for the straight sections G1, G2, G3, G4. On account of the different topologies of the straight sections G1, G2, G3, G4 and the different initial speeds, the curves for the straight sections G1, G2, G3, G4 are different.

Referring again to FIG. 5a, points P1, P2 on the curve for the straight section G1 indicate that, for a boost energy of 100 kJ, the lap time gain $\Delta t$ is one second, but for a doubled energy usage of 200 kJ, said lap time gain is not doubled, but rather increases merely to 1.5 seconds. From this it would appear to be clear that there is an optimum distribution of the boost energy partial quantities $E_{Boost1}$, $E_{Boost2}$, $E_{Boost3}$, $E_{Boost4}$ over the four straight sections G1, G2, G3, G4.

Figure 5B:
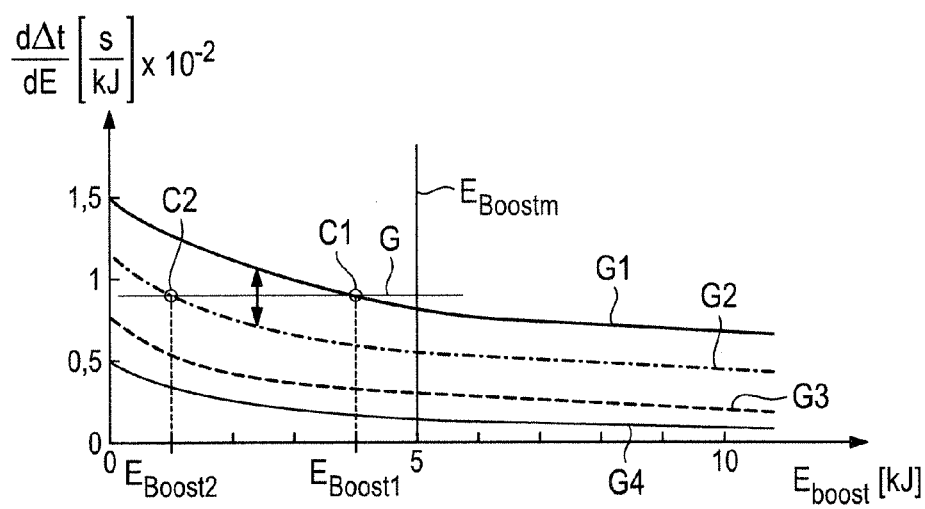
FIG. 5*b* is an illustration of the gradient of the lap time gain $\Delta t(s)/\Delta E(kJ)$ as a function of the boost energy quantity $E_{boost}$ (kJ) used for the straights G1 to G4 of the driving course of FIG. 2.

FIG. 5b shows an illustration of the gradients of the lap time gain $\Delta t(s)/\Delta E(kJ)$ as a function of the boost energy quantity $E_{boost}(kJ)$ used for the straights G1 to G4 of the driving course of FIG. 2.

As can be seen from FIG. 5b, the gradient of the lap time gain $\Delta t(s)/\Delta E(kJ)$ as a function of the boost energy quantity $E_{boost}(kJ)$ used for the straight sections G1 to G4 is greatest for the straight G1 and decreases from the straight section G1 to the straight section G4. The gradient is taken into consideration for optimizing the boost partial energy quantities to be used, as will be explained in more detail below with reference to FIG. 5b.

A straight line G is placed parallel to the boost energy axis (x axis) in FIG. 5b and is moved down proceeding from a position above the gradient curve for the straight section G1. When the gradient value 0.015 s/kJ is reached, the straight line G first intersects the gradient curve for the straight section G1. If the straight line G is moved downward farther, the point of intersection C1 with the gradient curve for the straight section G1 travels to the right toward higher boost energies, and a point of intersection C2 then also is formed with the gradient curve for the straight section G2. The straight line G ultimately is moved down until the sum of the boost energy values of the points of intersection C1, C2, ... is equal to the available total boost energy quantity $E_{boostm}$.

This optimization therefore yields the following values for the boost energy partial quantities: $E_{Boost1}$=400 kJ, $E_{Boost2}$=100 kJ, $E_{Boost3}$=$E_{Boost4}$=0, with the sum of the total boost energy quantity corresponding to $E_{Boostm}$=500 kJ.

Figure 4:
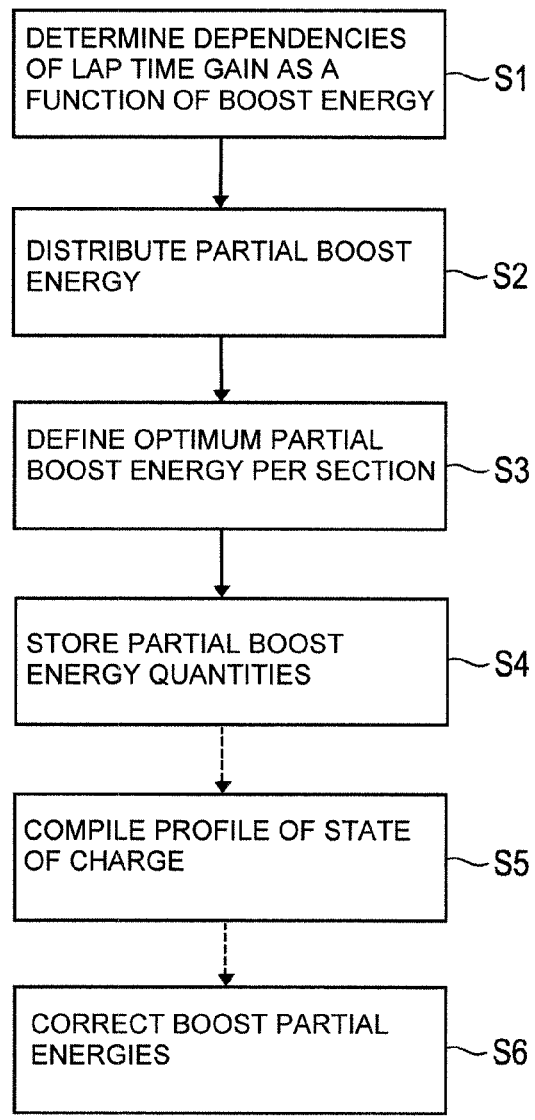
FIG. 4 is a flow diagram of an embodiment of the method according to the invention for specifying a boost control strategy of a hybrid vehicle drive.

FIG. 4 is a flow diagram of the method of the invention for specifying a boost control strategy of a hybrid vehicle drive.

The method of the invention for specifying a control strategy of a hybrid vehicle drive according to FIG. 4 can be divided into the steps S1-S4, which may be followed by two further optional steps S5, S6 which will be explained further below in conjunction with FIG. 6 in the second embodiment of the method according to the invention.

In step S1, the numerical dependencies of the lap time gain $\Delta t(s)$ as a function of the boost energy quantity $E_{Boost}$ used for the straights G1-G4 and the corresponding gradients are determined, as illustrated in FIG. 5a,b.

In step S2, the distribution of the partial boost energy quantities is optimized by calculus of variations on the basis of the determined gradients, as described above in conjunction with FIG. 5b. Here, the straight section G1 has the greatest partial boost energy quantity, and the straights G2, G3, G4 are provided with reduced partial boost energy quantities, corresponding to their smaller gradients.

In step S3, the optimum partial boost energy quantity to be used per straight section G1-G4 is defined.

In step S4, the defined partial boost energy quantities $E_{Boost1}$=400 kJ, $E_{Boost2}$=100 kJ, $E_{Boost3}$=$E_{Boost4}$=0 are stored in the device 1.

In the present exemplary embodiment, for simplicity, it is assumed that the partial boost energy quantities thus calculated are used or activated in each case at the start of a respective straight section G1, G2, G3, G4. It may also be expedient for the corresponding partial boost energy quantities to be used first during the later part of such a straight section, for example if the straight section in question enters a downward slope and the downward slope is followed by an upward slope.

The stored values and the predefined or determined corresponding activation points on the straight sections G1-G4 (in this case, for simplicity, in each case the starting point of the straight sections G1-G4) then are output via an output interface 20 of the device 1 according to FIG. 3, and may be stored in the hybrid vehicle drive of the vehicle F of FIG. 1 in a memory device (not illustrated). It is particularly advantageous if the output interface 20 can be connected directly to the bus system B of the hybrid vehicle drive.

During the course of a race, the respective optimized activation point is displayed to the driver on the display device D, so that if the track conditions allow, he can activate the boost operation at the optimized time by pressing the boost button BK, so that the defined optimized partial boost energy quantity automatically is released.

Figure 6A:
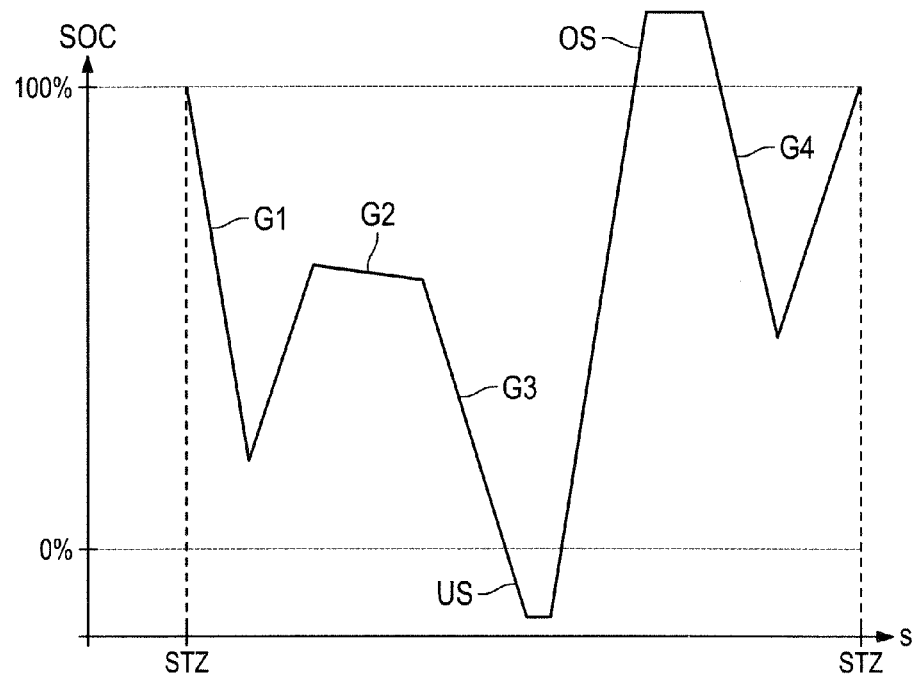
FIG. 6*a* is an illustration of the state of charge SOC of the boost energy store as a function of the driving distance s covered for a lap of the driving course of FIG. 2 using the boost control strategy which has been specified according to the embodiment of FIG. 3.

FIG. 6a shows the state of charge SOC of the boost energy store as a function of the distance s covered for a lap of the driving course of FIG. 2 when using the boost control strategy specified according to the embodiment of FIG. 3.

In this example, the following values for the partial boost energy quantities are defined: $E_{Boost1}$=150 kJ, $E_{Boost2}$=150 kJ, $E_{Boost3}$=50 kJ and $E_{Boost4}$=150 kJ.

As illustrated in FIG. 6a, in this example, it is not ensured at all times during the course of a lap that the optimized partial boost energy quantity is available in the electrical energy store ST of the vehicle hybrid drive of FIG. 1.

This is because the recuperation is track-dependent. For example, in the illustration according to FIG. 6a, the state of charge SOC of the electrical energy store ST at the start/finish STZ is 100%. On the straight G1, the partial boost energy quantity $E_{boost1}$ is extracted. Recuperation then takes place to approximately 65%. The partial boost energy quantities $E_{boost2}$ and $E_{boost3}$ for the straights G2 and G3 then are extracted and no recuperation takes place between these two extractions.

This theoretically could result in an undershoot US of the minimum state of charge, or in other words, could result in the partial boost energy quantity $E_{boost3}$ for the straight section G3 being lower than the optimized value.

Second, it is also possible for an overshoot OS of the maximum available state of charge to occur due to a relatively long recuperation phase, or in other words, more energy may be available in principle than is extracted according to the optimized partial boost energy quantities. This phenomenon is taken into consideration in the second embodiment of the method of the invention, as illustrated in FIG. 6b.

Referring again to FIG. 4, in a step S5, the profile of the state of charge illustrated in FIG. 6a is compiled taking into consideration the sequence of the straight sections G1-G4 and the recuperable energy.

In step S6, a correction of the boost partial energy quantities $E_{Boost1}$, $E_{Boost2}$, $E_{Boost3}$, $E_{Boost4}$ takes place until the hypothetical undershoot US and overshoot OS have disappeared, that is to say a further optimization takes place taking into consideration the boundary condition of the state of charge as a function of the driving course position.

Figure 6B:
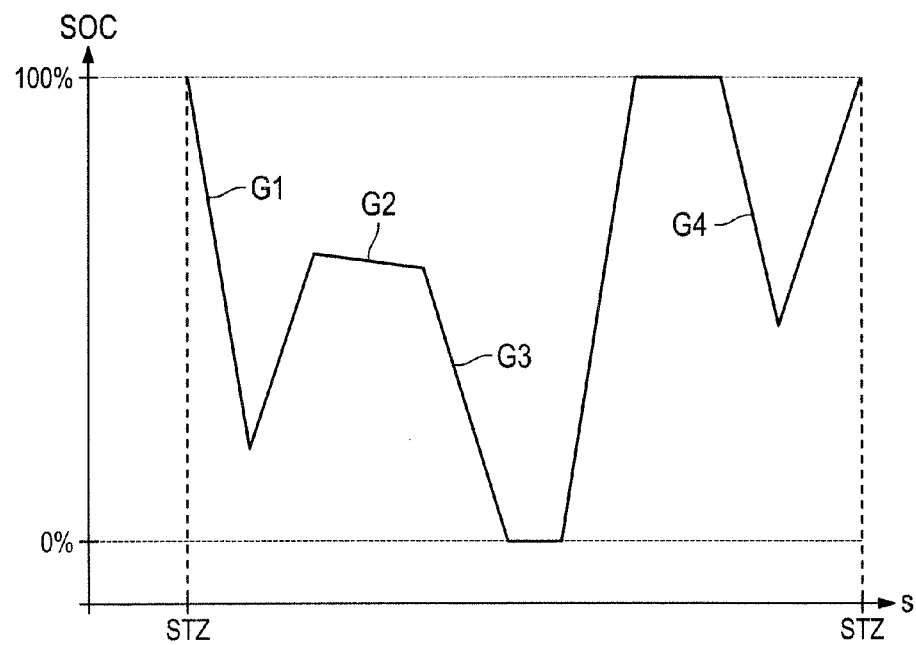
FIG. 6*b* is an illustration of the state of charge SOC of the boost energy store as a function of the driving distance s covered for a lap of the driving course of FIG. 2 using the boost control strategy which has been specified according to the one further embodiment of the method according to the invention.

FIG. 6b illustrates the state of charge SOC of the boost energy store as a function of the distance s covered for a lap of the driving course of FIG. 2 when using the boost control strategy specified according to a further embodiment of the method of the invention.

In a further step, it is also possible for no-load losses in the electrical energy store ST to be taken into consideration when defining the boost partial energy quantities $E_{Boost1}$, $E_{Boost2}$, $E_{Boost3}$, $E_{Boost4}$.

Even though the invention has been described above on the basis of preferred exemplary embodiments, the invention is not restricted to these exemplary embodiments, but rather may be modified in a variety of ways.

Even though it is the case in the embodiment described above that the present invention has been applied to a circuit, the invention can in principle be applied to any predefined driving course. Also, boost phases need not imperatively be distributed over the straight sections of a driving course, but rather may also be implemented in curve sections.

Even though it is the case in the embodiments described above that a manual switching device has been used to select the boost operation, other implementations, for example a sensor-controlled selection of the boost operation, are also conceivable.

What is claimed is:

1. A method for specifying a boost control strategy of a hybrid vehicle drive having an internal combustion engine and an electric motor, the method comprising:
   predefining a driving track with plural track sections;
   determining a respective dependency of a lap time gain on a boost energy quantity used, proceeding from a vehicle-specific lap time without boost assistance from the electric motor for a plurality of predetermined track sections; and
   defining a respective partial boost energy quantity for each predetermined track section based on the determined dependencies, with a sum of the partial boost energy quantities corresponding to a predefined available total boost energy quantity.

2. The method of claim 1, further comprising determining the respective partial boost quantities based at least partly upon a respective gradient of the determined dependencies.

3. The method of claim 1, further comprising determining the respective partial boost energy quantities based at least partially upon a charge state of an electrical energy store (ST) for storing the boost energy in the respective track section.

4. The method of claim 3, further comprising defining the respective partial boost energy quantities based at least partly on a consideration of a no-load loss of the electrical energy store.

5. The method as claimed of claim 1, with the driving track is a circuit.

6. The method of claim 1, wherein the predetermined track sections are straight sections.

7. The method of claim 1, wherein optimized activation times of the respective partial boost energy quantities within the predetermined track sections are defined on the basis of the topology of the driving track.

8. A device for specifying a boost control strategy of a hybrid vehicle drive having an internal combustion engine and at least one electric motor, having:

an input device for inputting a driving track with a multiplicity of track sections;

a simulation device for determining a respective dependency of a lap time gain on a boost energy quantity used, proceeding from a vehicle-specific lap time without boost assistance from the electric motor for a plurality of predetermined track sections; and an optimization device for defining a respective partial boost energy quantity for each predetermined track section based on the determined dependencies, with a sum of the partial boost energy quantities corresponding to a predefined available total boost energy quantity.

9. The device of claim 8, with an output interface (20) being provided for outputting the partial boost energy quantities for each predetermined track section.

10. The device of claim 9, wherein the output interface is connected directly to the bus system of the hybrid vehicle drive.

* * * * *